United States Patent [19]
Forlivio

[11] Patent Number: 4,913,498
[45] Date of Patent: Apr. 3, 1990

[54] CHILD RESTRAINT SEAT

[76] Inventor: Joseph Forlivio, 65 Bennett Ave., Yonkers, N.Y. 10701

[21] Appl. No.: 399,623

[22] Filed: Aug. 28, 1989

[51] Int. Cl.⁴ ............................................. B60N 1/12
[52] U.S. Cl. ................................... 297/488; 297/238
[58] Field of Search ................ 297/238, 250, 487, 488

[56] References Cited

U.S. PATENT DOCUMENTS

| 2,633,906 | 4/1953 | Franz | 297/488 |
| 4,230,366 | 10/1980 | Ruda | 297/238 X |
| 4,540,216 | 9/1985 | Hassel, Sr. | 297/112 X |
| 4,749,229 | 6/1988 | Derto | 297/113 X |
| 4,756,573 | 7/1988 | Simia et al. | 297/117 X |

Primary Examiner—Peter R. Brown
Attorney, Agent, or Firm—Abelman Frayne Rezac & Schwab

[57] ABSTRACT

An seat includes dual child restraints which are selectively moveable to an extended position to provide either a restraint for an infant or small child, or a restraint for a larger child, the seat back including a fixed portion providing a back support for an infant or child which is extended in surface area upon retraction of one of the child restraint's to provide a comfortable back support for a larger child, the respective child restraints when retracted into the seat back providing a comfortable back support for an adult.

2 Claims, 2 Drawing Sheets

CHILD RESTRAINT SEAT

FIELD OF THE INVENTION

This invention relates to seats, particularly automobile seats, that are equipped with restraint devices for use by an infant or young child.

BACKGROUND OF THE INVENTION

The requirement for restraint devices, such as seat belts and the like is mandatory in most states of this country, including devices for the restraint of an infant or young child.

Typically, such child restraint devices are constructed for them to be attached to the back of an automobile seat, and secured in position by the existing seat belts, or by ancillary belts that have been provided for that specific purpose. Such devices constitute an inconvenience to the user of the automobile, in that the device must be removed and stored if the automobile seat is to be used by an adult. Also, the occasion arises that the child restraint is required, but, the child restraint has been stored at some other location and is not readily available for use. Additionally, storage of the child restraint in the trunk of the automobile can constitute a source of inconvenience, in that it restricts the amount of available trunk space.

Structures have been proposed in which the child restraint is formed integrally with the back of an automobile seat, and, which can be extended for use by a child or infant, and then folded back into the seat back to enable the automobile seat to be used by an adult. Examples of such constructions of child restraint devices are to be found in Bernier U.S. Pat. No. 3,094,354 issued June 18, 1963, in Ruda U.S. Pat. No. 4,230,366 issued Oct. 28, 1980, in Hassel U.S. Pat. No. 4,540,216 issued Sept. 10, 1985, and, in Dorto U.S. Pat. No. 4,749,229 issued June 7, 1988.

Each of these prior patents teaches a restraint device incorporated into the back of an automobile seat, and which can be hinged downwardly for it to extend out of the seat back.

However, in each instance, no provision is made for the accommodation of children of different weights and sizes. Thus, the child restraints of the prior art are only of utility in providing a restraint for either an infant, but not a small child, or, a small child but not an infant, or, a child of a specific size and weight.

SUMMARY OF THE INVENTION

It is an object of this invention to provide a child restraint of the type incorporated into the back of an automobile seat that can accommodate infants or children of different weights and sizes, and, which can be stored in the back of the automobile seat in a manner returning the automobile seat to its general usage as a seat for an adult.

This is accomplished according to the present invention by the provision of two separate U-shaped restraint members which are hingedly mounted in the back of the automobile seat, and which are independently hingeable upwardly for them to be concealed in the seat back, or, are selectively hingeable downwardly for them to provide a child restraint appropriate to an infant, or, one appropriate to a child of a particular size and weight.

When employed for the restraing of an infant, both of the child restraints can be hinged downwardly into an extended position to provide a play surfce for the infant, a portion of the seat back providing a back support for the infant.

If the child restraint is to be employed for a child, then, the restraint employed for restraining an infant can be hinged upwardly in the seat back to provide an extension of the back support appropriate to a child.

If the restraint is not required for use by an infant or child, then, both of the restraints can be hinged upwardly into the seat back, thus providing a continuous back support for use by a teenager or an adult.

DESCRIPTION OF THE DRAWINGS

The child restraint of the present invention will now be described with reference to the accompanying drawings, which illustrate a preferred embodiment of the invention, and in which.

DESCRIPTION OF THE PREFERRED EMBODIMENT

The automobile seat includes a seat portion 10 and a seat back 12.

Figure 1:
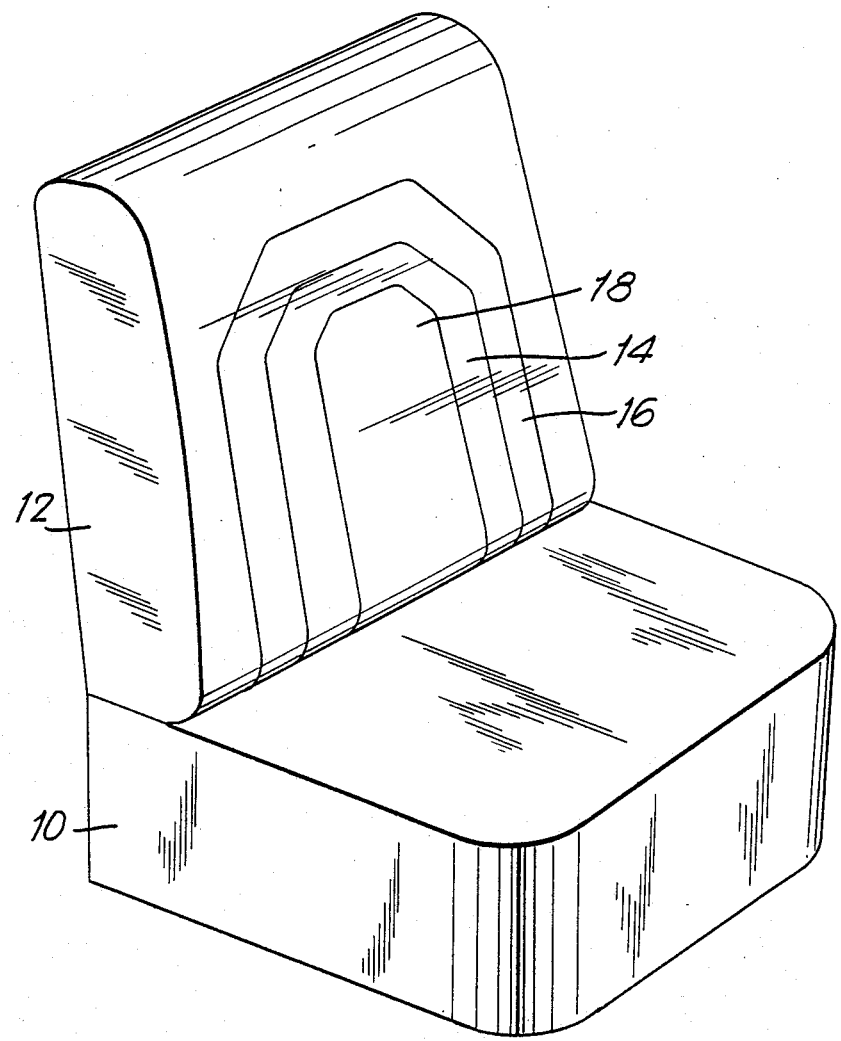
FIG. 1 is a perspective view of an automobile seat incorporating the child restraint of the present invention, and showing the child restraint in a retracted position in which the automobile seat is usable by a teenager or adult; and, FIG. 2 is a perspective view of the automobile seat showing the child restraints in an extended and a partially extended condition.

As is illustrated in FIG. 1, the seat back 12 provides a substantially continuous support surface for the back of an adult, thus closely approximating the seat back of a conventional automobile seat.

Contained within the seat back 12 are two U-shaped child restraint members 14 and 16, which respectively surround a seat back portion 18. The seat back portion 18 is an integral part of the seat back 12 and is fixed and immovable relative thereto, the respective child restraints 14 and 16 being selectively moveable relative to each other and relative to the seat back 12, as now discussed with respect to FIG. 2.

Figure 2:
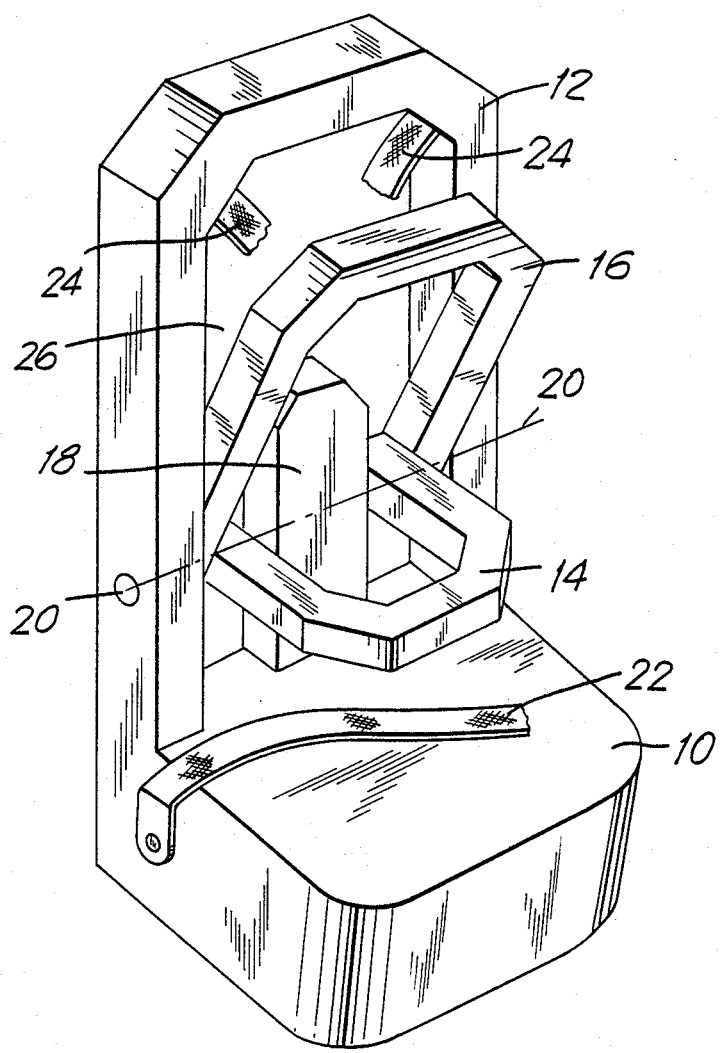

In FIG. 2, what can be termed as an infant restraint is provided by the child restraint 14, the child restraint 14 having been hinged downwardly out of the seat back through an angle of approximately 90° about a pivotal axis 20 common to both the child restraint 14 and the child restraint 16. In this position of the child restraint 14, it will be seen that the fixed seat back portion 18 provides a back support for the infant or small child.

If the child support is to be used for an infant or small child, then, the child restraint 16 also can be hinged down into registry with the child restraint 14, the upper surfaces of the child restraints 14 and 16 then providing an extended play surface for the infant or child.

If now the child restraint is to be employed for restraining a larger child, then, the child restraint 14 is folded upwardly and the child restraint 16 is moved to its extended position. In this orientation of the child supports, then, the child support 14 provides an extension of the seat back portion 18, thus providing a comfortable back support for the larger child.

In addition to the child restraints 14 and 16, the automobile seat 10 will of course be provided with the conventional seat belts, indicated at 22 which can extend over the lap of the infant or child. Preferably, further restraining straps, indicated partially at 24 are provided within the recess 26 in the seat back in which the restraints 14 and 16 are received. In that position, they are concealed from view and possible discomfort to an adult user of the seat by the restraints 14 and 16. Conveniently, the straps 24 form complimentary halves to the respective halves of the seat belt 22, the respective halves of the seat belt 22 then being respectively connectable to the respective restraints 24 to provide an X-form harness for the child.

As will be appreciated, various modifications can be made in the structure as described above. For example, locks can be provided associated with the respective restraints 14 and 16 for locking them in the extended position, such that they cannot be raised by a child who pushes upwardly against the underside of the extended restraints 14 and 16. Additionally, other forms of restraints 22 and 24 can be provided to provide a harness for the infant or child.

I claim:

1. A child restraint that is storable in a seat back, and which is hingeable downwardly to an extended position to provide a child restraint, comprising:
   a first U-shaped child restraint member pivotally mounted in said seat back for movement between a retracted position in which said first child restraint provides a continuation of the external surface of said seat back, and an extended position for use as a child restraint;
   a second U-shaped child restraint member pivotally mounted in said seat back and moveable from a retracted position in which said second child restraint provides a continuation of the surface of said seat back, and an extended position for use as a child restraint;
   said first and second child restraint members being moveable independently of each other between said retracted and extended positions; and,
   a fixed portion of said seat back providing a continuation of the surface of said seat back, and which is surrounded by said first and second restraint members when in a retracted position;
   whereby, with each said child restraint positioned in a retracted position a continuation of the surface of said seat back is provided providing back support for an adult;
   when said first child restraint is extended, said fixed seat back portion provides a back support for an infant or small child;
   when said first child restraint is retracted and said second child restraint is extended, said first child restraint provides a continuation of the surface of said fixed seat back portion to provide a back support for a larger child; and,
   when both of said first and second child restraints are extended, an upper surface of said extended child restraints provides a play area for an infant or child.

2. The child restraint of claim 1, further including restraining straps incorporated into said seat back for restraining an infant or child.

* * * * *